Sept. 23, 1969    E. G. OBEDA    3,468,731
METHOD AND APPARATUS FOR SONICALLY SEALING THE END PORTION OF
THERMOPLASTIC TUBULAR CONTAINERS
Filed July 1, 1966    2 Sheets-Sheet 1

EDWARD G. OBEDA
INVENTOR.
BY:
Erwin B. Steinberg

EDWARD G. OBEDA
INVENTOR.

BY:

Ervin B. Steinberg

United States Patent Office 3,468,731
Patented Sept. 23, 1969

3,468,731
METHOD AND APPARATUS FOR SONICALLY SEALING THE END PORTION OF THERMOPLASTIC TUBULAR CONTAINERS
Edward G. Obeda, Brookfield, Conn., assignor to Branson Instruments Inc., Stamford, Conn., a corporation of Delaware
Filed July 1, 1966, Ser. No. 562,358
Int. Cl. B32b 31/20; B29c 17/00
U.S. Cl. 156—73                                   8 Claims

ABSTRACT OF THE DISCLOSURE

A method and apparatus for sealing thermoplastic tubular containers comprises interposing the end portion to be sealed between an anvil and a sonically vibratory tool, flattening the sides and squeezing them into intimate contact, the dissipation of sonic energy causing the sides to fuse together and provide a seal. Resulting from the shape of the anvil or tool, a transverse recess is provided in the flattened and sealed container end to collect thermoplastic material displaced during the sealing operation.

---

This invention relates to a method and apparatus for sealing plastic containers, particularly collapsible tubes, which enclose fluent substances, such as liquids and creams, and wherein portions of such substances are discharged by squeezing and collapsing the flexible walls of the tubes.

During the recent period there has been evident an ever-increasing trend toward a change of the material used for flexible and collapsible tubes from metal to plastics. Typically, tubes of this type are made from polyethylene thermoplastic material or, alternatively, from laminated material, as for instance a polyethylene inner liner, a foil interface and an outer covering. After filling the tube with the desired substance, the end portion is sealed so as to confine the dispensable substance within the tube. Metallic tubes, particularly those made of aluminum, are sealed by squeezing and flattening the very end portion and folding the flattened portion back on itself one or more times. Crimping may be used to secure the folded portion. Sometimes a U-shaped retaining piece is slid over the folded portion in order to reinforce the seal. However, because of the resiliency of the container material, such a fold-back operation is not possible when plastic tubes are used and heat sealing is employed instead. More recently, sealing of the end portion by sonic energy has come into use, particularly since sonic sealing is accomplished quickly and efficiently, and without perceptible heat transfer to adjacent areas. Additionally, sealing with sonic energy is effective despite the presence of contaminants at the sealing surface.

A typical sonic sealing arrangement comprises a stationary anvil and a sonic energy converter fitted with an oscillating horn, vibrating in the order of 20,000 cycles per second, and oscillating toward and away from the anvil. By interposing the plastic tube between the horn and the anvil a seal is obtained in a very short time.

In the prior art bar type horns have been used which exhibit for the sealing surface a rectangular plane face. These horns, however, are afflicted with certain shortcomings. The flow of the plastic material during the sonic welding cycle is not accurately controlled and, hence, closures are not obtained with a sufficient degree of reliability. It has been discovered that such reliability can be increased considerably when providing means which control the flow of the softened thermoplastic material during the sealing cycle. Specifically, a noticeable improvement has been obtained by providing a recess in the sealing surface of the anvil, the horn, or both in order to produce in the sealed portion of the tube a cavity which is adapted to be filled by the displaced thermoplastic material, such material in turn, fusing and providing a positive seal.

One of the principal objects of this invention is, therefore, the provision of an improved method and apparatus for sealing plastic tubes.

Another important object of this invention is the provision of an improved method and apparatus for sealing flexible thermoplastic tubes by sonic energy.

Another and further object of this invention is the provision of an improved arrangement for sealing the end portion of flexible thermoplastic tubes which are filled with fluent material, the arrangement employing sonic energy and controlling the flow of thermoplastic material during the sealing cycle.

Another and still further object of this invention is the provision of a method and apparatus for sealing collapsible tubular thermoplastic containers by sonic energy, which method involves the flattening and squeezing the inner container surfaces into contact with one another, applying sonic energy, and simultaneously providing along the flattened portion a cavity transverse to the longitudinal axis of the tubular container, such cavity being provided for collecting thermoplastic material displaced from the squeezed portion.

Further and still other objects of this invention will be more clearly apparent by reference to the following description when taken in conjunction with the accompanying drawings, in which.

Figure 1:
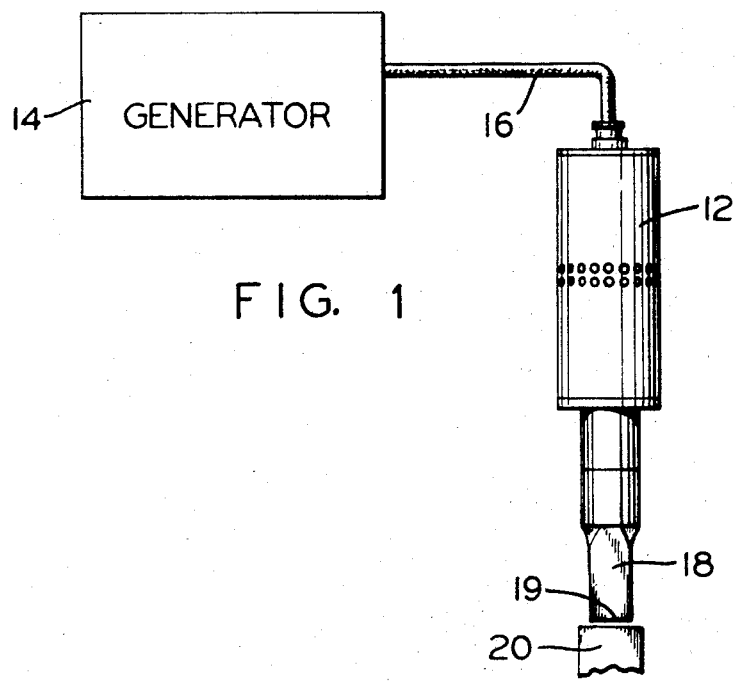
FIGURE 1 is a schematic representation of a typical sealing unit employing sonic energy.

Referring now to the figures and FIGURE 1 in particular, there is shown a sealing unit employing sonic energy and comprising a sonic energy converter, reference numeral 12, which is energized via an electrical conductor 16 from a high frequency generator 14. The converter unit 12 includes a transducer element (not shown), either a magnetostrictive or a piezoelectric means, in order to convert the electrical high frequency energy supplied thereto from the generator 14 to mechanical oscillations. The converter unit 12 is fitted with an output horn 18 which serves to ampify the mechanical oscillations produced by the transducer element. The oscillations are apparent at the horn's frontal surface 19 which moves toward and away from a stationary anvil 20. By interposing thermoplastic material between the frontal surface of the horn and the anvil, welding by sonic energy is obtained. Typically, the generator supplies frequency in the order of 20 kilocycles per second, which is in the ultrasonic frequency range, but it should be understood that frequencies in the higher or lower frequency range may be employed. Sonic energy sealing units of this type are available commercially from Branson Sonic Power, a Division of Branson Instruments, Incorporated, Danbury, Conn., as model J–17V or J–32. The sealing of thermoplastic parts is described also in the U.S. Patent issued to Robert S. Soloff et al., No. 3,224,916, dated Dec. 21, 1965, entitled "Sonic Method of Welding Thermoplastic Parts," which patent is assigned to the same assignee.

Figure 2:
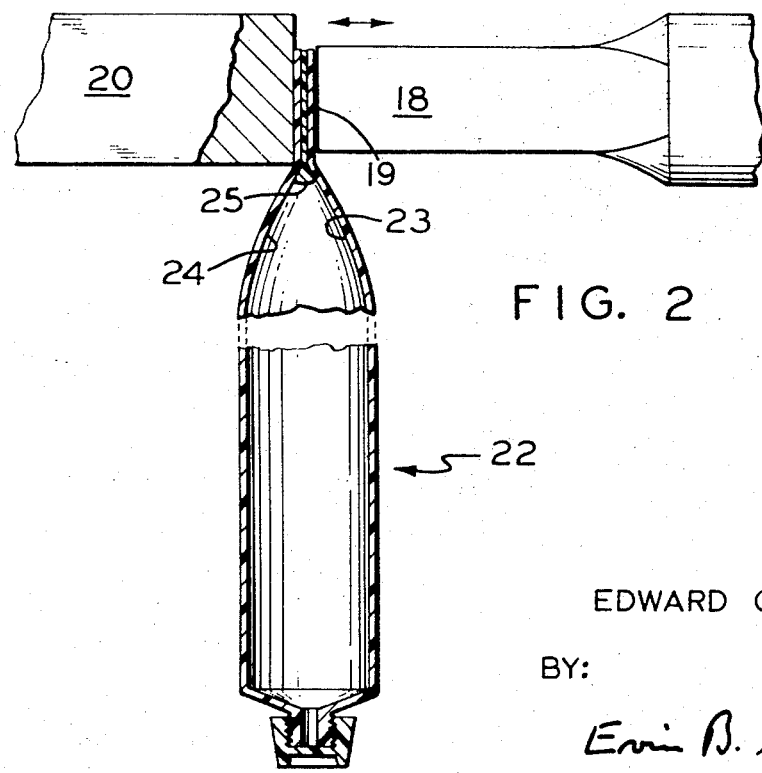
FIGURE 2 is an elevational view, partly in cross section, illustrating the sealing process in accordance with the prior arrangement.

FIGURE 2 shows a typical ultrasonic sealing arrangement wherein a workpiece, e.g. a conventional flexible thermoplastic tube 22, filled with a suitable material, is interposed between two pressure surfaces, i.e. the frontal surface 19 of the oscillating horn 18 and the opposing surface of the anvil 20. The horn closing upon the anvil, causes a flattening and compressing of the tube 22 and, subsequently, the dissipation of sonic energy at the thermoplastic inner surfaces 23 and 24 at the area directly underneath the horn's frontal surface causes a softening of the material and a fusing thereof so as to produce a seal. The material hardens almost instantaneously upon the completion of the delivery of the required amount of sonic energy and the withdrawal of the horn 18 from the tube 22. The horn may be maintained for a brief moment in engagement with the tube without oscillation in order to provide pressure during the hardening phase of the sealing cycle. Typically, a seal is made in one second or less using one of the units identified hereinabove.

When accomplishing this type of sealing, the frontal portion of the horn is generally shaped in the form of a bar, for example one-quarter inch wide by two inches long, the precise dimension being dependent somewhat on the size of the tubes to be sealed. It has been found that under the influence of the intense high frequency hammering of the frontal surface of the horn upon the thermoplastic tube the softened thermoplastic material is displaced and flows forward into the open space beyond the actual sealing surface and accumulates thereat as a bead, as is indicated by the numeral 25 in FIGURE 2. This bead, caused by the displaced thermoplastic material, may be large or small, being independent upon the duration of the sealing cycle, the thickness of the thermoplastic layer and other parameters of the sealing process. This uncontrolled flow of thermoplastic material seriously affects the reliability and confidence level with which seals are established. For this reason it has been found desirable, if not necessary, to provide a means which controls the flow of softened and displaced thermoplastic material.

Figure 3:
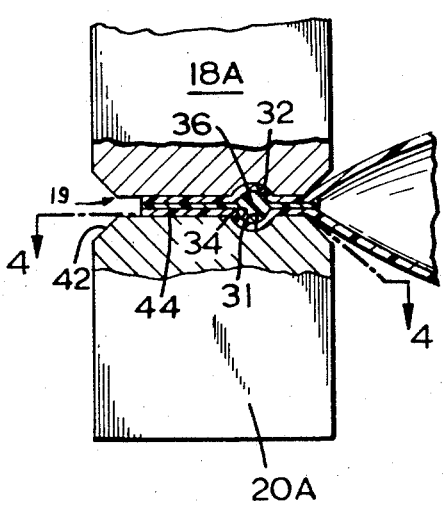
FIGURE 3 is a sectional view of the sealing portion of the horn and anvil, showing specifically the improvement made by this invention.
Figure 4:
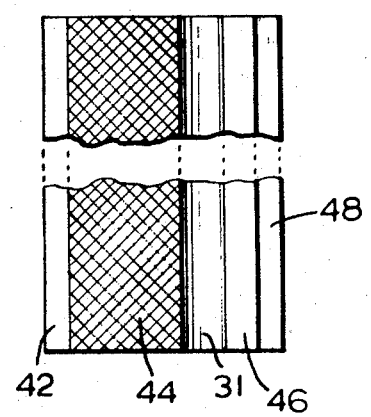
FIGURE 4 is a view along line 4—4 in FIGURE 3.

The particular improvement developed is shown in FIGURES 3 and 4, both figures illustrating only the improvement made in the horn's frontal surface and in the anvil. All other portions remain the same. The anvil 20A and frontal surface of the horn 18A are provided with a respective longitudinal recess or groove 31 and 32, the grooves running along the sealing surface and transverse to the longitudinal axis of the tube 22. These grooves cut into the respective pressure surfaces cause a cavity 34 to be formed during the sealing process, the cavity being adapted to receive the displaced thermoplastic material 36. In this manner the bead 25, FIGURE 2, reaching into the open area of the tube 22 is largely eliminated and the flow of thermoplastic material is controlled so as to occur predominantly only at a location which has been provided for such purpose. The accumulation of thermoplastic material within the sealing surface, in addition, contributes to improved strength and increased reliability of the seal.

FIGURE 4 is a plan view of the sealing surface of the anvil, but it shall be understood that in the preferred embodiment the horn is shaped in precisely the same manner. Numeral 42 identifies the chamfered edge area, which is followed by a knurled area 44. The knurling serves to increase the localized sealing pressure and simultaneously provides a most pleasing appearance of the sealed area. Numeral 31 refers to the recess described heretofore, numeral 46 identifies the continuation of the flat sealing surface, and numeral 48 identifies another chamfered edge surface. In a typical example, the flat, knurled area 44 is one-eighth inch wide by two inches long, the groove 31 has an undercut of 0.015 inch radius, and the surface 46 is approximately one-sixteenth inch wide.

Figure 5:
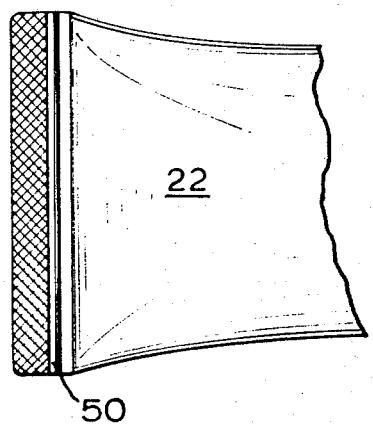
FIGURE 5 is a top plan view of the sealed end of the tube produced by the present improvement.
Figure 6:
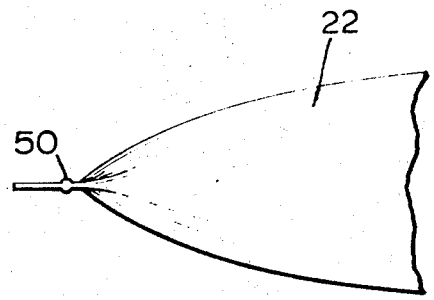
FIGURE 6 is a side view of the sealed tube portion shown in FIGURE 5.

FIGURE 5 and 6 show the appearance of the sealed tube, clearly illustrating the presence of a small ridge 50 running along the sealing surface and transverse to the longitudinal axis of the tube, and providing a cavity in order to confine therein the thermoplastic material displaced during the sealing cycle.

It should be understood that the substance to be dispensed and normally found within the tube when the sealing operation occurs has not been illustrated in FIGURES 2 and 3, as it does not form a part of this invention.

What is claimed is:

1. The method of sealing by sonic energy the end of a tubular container having an inner sealing surface made of thermoplastic material comprising:
    disposing the end of the container to be sealed between the pressure surfaces of an anvil and a sonically vibrating tool, at least one of said pressure surfaces being provided with a recess along its pressure surface transverse to the major axis of the container;
    urging the tool toward the anvil into vibrating contact with the container end while said container end is confined therebetween for flattening the confined container side portions and forcing the inner juxtaposed surfaces of the container into intimate contact for heat sealing, and
    simultaneously forming a cavity in the flattened sealed side portion for receiving the thermoplastic material displaced during the sealing operation.

2. The method as set forth in claim 1 wherein said tool vibrates along an axis substantially normal to the plane of the flattened portion of the container.

3. The method as set forth in claim 1, said vibrating tool vibrating in the ultrasonic frequency range.

4. An apparatus for sealing by sonic energy the end of a tubular container having an inner sealing surface made of thermoplastic material comprising:
    an anvil and an opposing sonically vibrating horn adapted to flatten, compress and seal the end portion of a container disposed therebetween;
    said anvil and said horn, each having respectively substantial flat opposing pressure surfaces for applying pressure to the exterior of the container for causing the inner surfaces to be pressed into intimate contact and form a seal responsive to the dissipation of sonic energy, and
    at least one of said pressure surfaces being provided with a recess disposed along the length of the pressure surface for causing a cavity to be formed in the flattened and compressed container portion, said cavity adapted to collect therein thermoplastic material displaced during the sealing operation.

5. An apparatus for sealing by sonic energy as set forth in claim 4 wherein said anvil and said horn are provided with a respective recess.

6. An apparatus for sealing by sonic energy as set forth in claim 5 wherein said recesses are in register with one another.

7. An apparatus for sealing by sonic energy the end of a tubular container having an inner sealing surface made of thermoplastic material comprising:
    an anvil and an opposing sonically vibrating horn adapted to flatten and squeeze therebetween the end portion of a container to be sealed;
    said anvil and said horn, each having respectively substantially flat, opposing pressure surfaces for applying pressure to the exterior of the container for causing the inner flattened thermoplastic surfaces to be sealed to each other;

said pressure surfaces being provided with a recess disposed along the length thereof for causing a cavity to be formed in the flattened and squeezed portion of the container, said cavity adapted to collect therein thermoplastic material displaced from said squeezed container portion, and said pressure surfaces including also a knurled portion for providing a knurled pattern on the exterior of the sealed portion.

8. An apparatus for sealing by sonic energy as set forth in claim 7 wherein said recess is formed by a groove cut into the respective pressure surfaces and said groove is disposed substantially transverse to the longitudinal axis of the tubular container adapted to be sealed.

References Cited

UNITED STATES PATENTS

| 2,994,361 | 8/1961 | Gable et al. | 264—248 |
| 3,367,809 | 2/1968 | Soloff | 156—73 |
| 3,189,227 | 6/1965 | Hobbs et al. | 222—107 XR |

HAROLD ANSHER, Primary Examiner

PHILIP DIER, Assistant Examiner

U.S. Cl. X.R.

29—470.1; 53—373; 156—198, 306, 380, 581; 161—146; 228—1; 264—248